FERROELECTRIC CIRCUITS

Filed Nov. 21, 1955 3 Sheets-Sheet 1

INVENTOR
J. R. ANDERSON
BY [signature]
ATTORNEY

INVENTOR
J. R. ANDERSON
BY [signature]
ATTORNEY

FERROELECTRIC CIRCUITS

Filed Nov. 21, 1955 3 Sheets-Sheet 3

INVENTOR
J. R. ANDERSON
BY [signature]
ATTORNEY

United States Patent Office 3,005,976

Patented Oct. 24, 1961

3,005,976
FERROELECTRIC CIRCUITS

John R. Anderson, Berkeley Heights, N.J., assignor to Bell Telephone Laboratories, Incorporated, New York, N.Y., a corporation of New York Filed Nov. 21, 1955, Ser. No. 548,034
13 Claims. (Cl. 340—166)

This invention relates to ferroelectric circuits and, more particularly, to ferroelectric switching circuits.

Ferroelectric crystals possess electric dipoles which become oriented in the same direction under the influence of an applied electric field. This remanent polarization may be reversed by the application of an electric field to the crystal in a direction to oppose these dipoles. When the dipoles are reversed, the crystal is said to be switched and the switching is characterized by a relatively large output current pulse to a serially connected load. If the applied field is in a direction to aid the orientation of the dipoles, no switching or reversal of the dipoles takes place, which condition is characterized by a relatively small spike of output current to a serially connected load. This polarization and switching of ferroelectric crystals is explained in my Patent No. 2,717,372, issued September 6, 1955.

Priorly, ferroelectric capacitors have generally been employed as storage elements in memory circuits, matrices and shift registers. However, I have found that such capacitors are not inherently limited to such uses and may be employed in a variety of other functions.

Accordingly, it is an object of this invention to provide improved ferroelectric circuits.

Another object of this invention is to provide improved switching circuits using ferroelectric capacitors which exhibit a substantially rectangular hysteresis loop.

It is a further object of this invention to provide improved switches utilizing the switching characteristics of ferroelectric capacitors selectively to control the transmission of pulses.

It is a further object of this invention to provide improved switching circuits employing the remanent polarization property of ferroelectric crystals and controlling the reversal of this remanent polarization by means of pulses applied to the switching circuit.

It is a still further object of this invention to provide improved preset switches using the remanent polarization property of ferroelectric crystals.

It is another object of this invention to provide an improved method for fabricating a combination of a ferroelectric matrix and matrix access switches.

It is still another object of this invention to provide an improved method for making a shunt switch selection matrix.

Briefly, in accordance with aspects of this invention, a ferroelectric capacitor is connected in a parallel branch between a pulse source and a load. The conductivity of the parallel branch is effectively changed from an open circuit condition to a low impedance condition to control the current delivered to the load from the pulse source. Advantageously, this conductivity may be controlled by physically opening the parallel branch, or the change may be effected by the application of suitable control pulses to the parallel branch. These pulses control the presence or absence of switching of the ferroelectric capacitor and thus determine the Off or On condition, respectively, of the switch.

If a ferroelectric capacitor is connected in parallel with a load, and a pulse source is connected to the parallel network, the admittance of the branch including the capacitor determines the amount of current delivered to the load. For example, if the branch including the capacitor presents a very low admittance to the pulses from the pulse source, a relatively large current reaches the load, whereas, if the capacitor presents a relatively high admittance, then a relatively small current reaches the load.

Under switching conditions the ferroelectric capacitor exhibits an equivalent circuit including a parallel network of a small capacitance which we may designate as $C_0$, which is the small signal capacitance of the ferroelectric and is always connected in the equivalent circuit serving to determine the magnitude of the admittance when no switching takes place. Connected in parallel with this capacitance $C_0$, only at times when switching takes place, is an equivalent switching resistance $R_S$, the value of which is determined by the slope of the peak switching current versus the applied voltage. This switching resistance is proportional to the square of the thickness of the ferroelectric crystal and is inversely proportional to the electrode area. Experimental results have indicated that this switching resistance is in the order of 200 to 500 ohms for capacitors having 4 x 4 mil electrodes and a barium titanate dielectric, but it is to be understood that this range of values may be modified by changing any of the previously mentioned variables as well as changing the temperature or ferroelectric material.

The switching of these shunt connected ferroelectric capacitors can be controlled in at least two ways, the first being to open the branch of the parallel circuit including the ferroelectric capacitor when it is desired to turn the switch on and close this branch when it is desired to turn the switch off. The second method of controlling this switch is to apply a control voltage to the branch including the ferroelectric capacitor at a point remote from the pulse source. Control of the switch is now achieved by applying pulses complementary to the input pulses to turn the switch off or by supplying noncomplementary pulses or no pulses to the parallel branch in order to turn the switch on. Complementary control pulses combine with the input pulses to switch the capacitor and thus present a low impedance to the input pulses, whereas, noncomplementary pulses prevent the capacitor from switching and thus the capacitor presents its small signal capacitance to the pulse source.

In one specific illustrative embodiment of this invention comprising a switch, a ferroelectric capacitor and a serially connected resistor are connected in parallel with the load with respect to a pulse source, and control potentials are applied intermediate the ferroelectric capacitor and the resistor selectively to determine the admittance of the parallel branch including the ferroelectric capacitor and thus control the passage of the pulses from the pulse source to the load.

In another specific illustrative embodiment of this invention, a ferroelectric capacitor, a saturation diode and a resistor are connected in series, which series network is connected in parallel with a load with respect to a pulse source. Control voltages are selectively applied intermediate the resistor and the saturation diode to control the admittance of the parallel branch including the ferroelectric capacitor and thus control the passage of pulses to the load.

In still another specific illustrative embodiment, a ferroelectric capacitor and a serially connected resistor are connected in parallel with the load with respect to a pulse source, and a second ferroelectric capacitor is connected in series between the pulse source and the parallel network. The admittance of the parallel branch including the first ferroelectric capacitor is controlled by the application of control voltages intermediate the resistor and the first ferroelectric capacitor. The switching of the second ferroelectric capacitor then takes place either through the parallel branch including the first ferroelectric capacitor or through the load, depending upon the relative admittance of the two branches.

In still another specific illustrative embodiment of this invention, a ferroelectric capacitor exhibiting an internal bias is connected in series with a resistance, and this series network is connected in parallel with a load with respect to a pulse source. The admittance of the parallel branch including the ferroelectric capacitor is controlled by control voltages applied intermediate the capacitor and the resistor, which control voltages differ from those applied to the ordinary ferroelectric capacitor by the magnitude necessary to overcome the internal bias.

In another specific illustrative embodiment of this invention, the combined access switches of the ferroelectric type and a ferroelectric matrix are formed on a single crystal of ferroelectric material in such manner as to present a unitary switching and storage circuit.

In still another specific illustrative embodiment of this invention, ferroelectric switches employing saturation diodes are connected to a plurality of other ferroelectric switches in groups whereby actuation of one of the first ferroelectric switches controls the operation of a predetermined group of the second ferroelectric switches.

Accordingly, it is a feature of this invention to connect a ferroelectric capacitor in parallel with a load with respect to a pulse source and selectively control the admittance of the parallel branch including the ferroelectric capacitor effectively to control the transmission of pulses to the load.

It is another feature of this invention to connect a branch in parallel with the load with respect to a pulse source, which branch includes a ferroelectric capacitor serially connected to an impedance, and to control the transmission of pulses from the source to the load by the application of control pulses intermediate the capacitor and the impedance.

It is another feature of this invention to provide a shunt switch selection matrix including a plurality of ferroelectric capacitors.

It is another feature of this invention to provide a method for combining a shunt switch selection matrix with a ferroelectric matrix on a single crystal of ferroelectric material.

It is another feature of this invention to provide a shunt switch including a ferroelectric capacitor having an internal bias.

A complete understanding of this invention and of these and various other features thereof may be gained from consideration of the following detailed description and the accompanying drawing in which.

Figure 1:
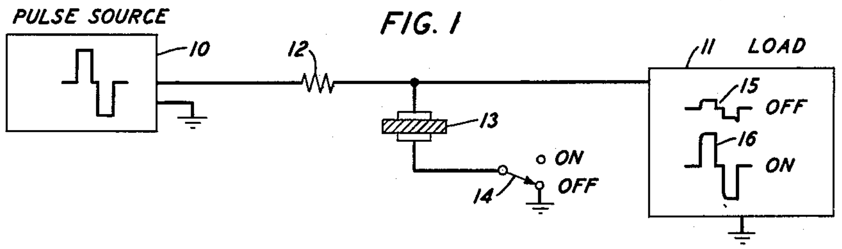
FIG. 1 is a schematic representation of one specific illustrative embodiment of a shunt type ferroelectric switch in accordance with this invention.

Turning now to FIG. 1, one specific illustrative embodiment of this invention is there depicted in schematic and block diagram form. Connected between pulse source 10 and load 11 is a resistor 12. Connected in parallel with the load with respect to pulse source 10 is a parallel branch including ferroelectric capacitor 13 and switch 14. If switch 14 is in the Off position, the parallel branch including capacitor 13 and switch 14 is closed and the remanent polarization of a capacitor 13 is subject to being switched by the pulses from source 10. The parallel branch therefore acts as the shunt arm in a simple L-type attenuator, and the capacitor in switching presents its switching resistance $S_S$ which is in the order of hundreds of ohms to effectively bypass the pulses from pulse source 10 around the load. The small current delivered to the load is in the shape of waveform 15. If switch 14 is moved to the On position, thus effectively inserting an infinite impedance in the shunt branch, the current delivered to load 11 is represented by waveform 16.

Figure 2:
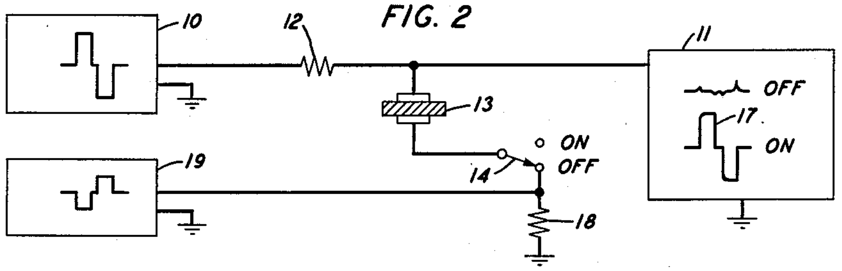
FIG. 2 is a schematic representation of another specific illustrative embodiment of a shunt type switch in accordance with this invention.

The On to Off ratio of currents under the two conditions of the circuit depicted in FIG. 1 may be improved by utilizing the embodiment depicted in FIG. 2. In FIG. 2, resistor 18 is added to the circuit branch which includes capacitor 13, and a pulse source 19 is connected intermediate resistor 18 and the Off contact of switch 14. The pairs of pulses from pulse source 19 are equal in magnitude to the coercive voltage drop across capacitor 13. The pulses from source 19 are applied in pairs to cooperate with pulse source 10 in providing for switching and resetting of capacitor 13.

Figure 3:
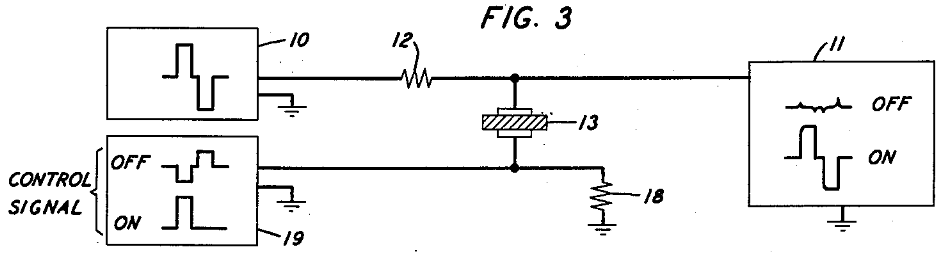
FIG. 3 is a schematic representation of a specific illustrative embodiment of a pulse controlled shunt type switch in accordance with this invention.

FIG. 3 depicts another specific embodiment of this invention in which the previously disclosed switch 14 is replaced by separate pulses from pulse source 19 depending on whether the Off or On condition of the shunt switch is desired. To turn the shunt switch off, pulse source 19 delivers complementary pulses to the branch concurrently with the application of input pulses from source 10, that is, when a positive going pulse is supplied from source 10, a negative going pulse is supplied from source 19 to reverse the remanent polarization of capacitor 13. Similarly, when a negative going pulse is supplied from source 10, a positive going pulse is supplied from source 19 to reset capacitor 13. In each instance, the effect of the pulses from the two pulse sources is additive and causes reversal of the remanent polarization of ferroelectric capacitor 13. If it is desired to turn the switch on, noncomplementary pulses are supplied from source 19. The positive pulse from source 19 is of equal magnitude to that from source 10. Thus, no voltage drop occurs across the equivalent small signal capacitance of capacitor 13 and a substantially rectangular pulse is delivered to load 11.

Figure 4:
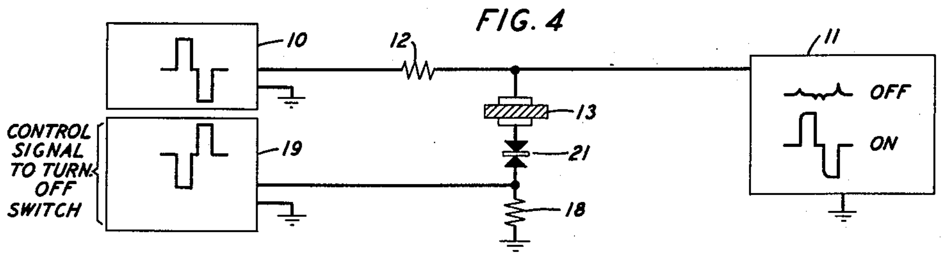
FIG. 4 is a schematic representation of a specific illustrative embodiment of a preset shunt type switch in accordance with this invention.

FIG. 4 depicts a preset shunt switch circuit in which control voltages are only applied to turn the switch off. Double anode silicon diode 21 is connected between capacitor 13 and resistor 18 in the switching branch. These diodes exhibit a saturation or breakdown characteristic in response to voltages of given magnitude regardless of polarity, as explained more fully in my application Serial No. 513,710, filed June 7, 1955, now Patent 2,876,435, issued March 3, 1959. Pulses from pulse source 10 are insufficient to switch ferroelectric capacitor 13 and also overcome the breakdown potential of saturation diode 21. Thus, substantially all of the current from pulse source 10 reaches load 11 when the switch is in the On condition. If now concurrent complementary pulses are applied from sources 10 and 19, the resultant voltages applied to capacitor 13 and diode 21 are sufficient to reverse the polarization of capacitor 13 and thus cause substantially all of the current from source 10 to pass through the branch including capacitor 13, thereby establishing the Off condition of the switching circuit.

Figure 5:
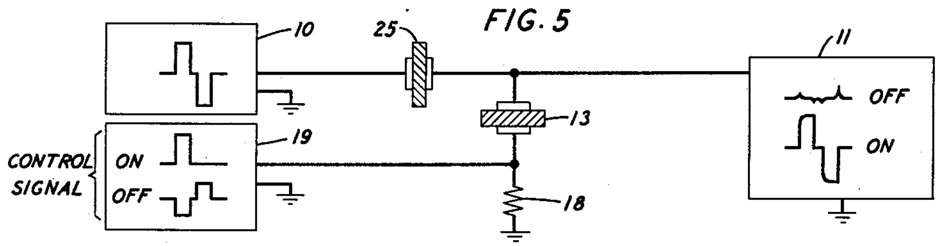
FIG. 5 is a schematic representation of another specific illustrative embodiment of a pulse controlled switch in accordance with this invention.

FIG. 5 depicts another specific embodiment of this invention in which resistor 12 is replaced by ferroelectric capacitor 25 between pulse source 10 and load 11. Each pulse from source 10 causes a reversal of the domains of capacitor 25, thus causing this capacitor to present its equivalent switching resistance $R_S$ to the incoming pulses. The control pulses utilized in connection with FIG. 5 are identical with those employed in connection with FIG. 3, and the output waveforms are substantially identical to those delivered to load 11 in FIG. 3.

Figure 6:
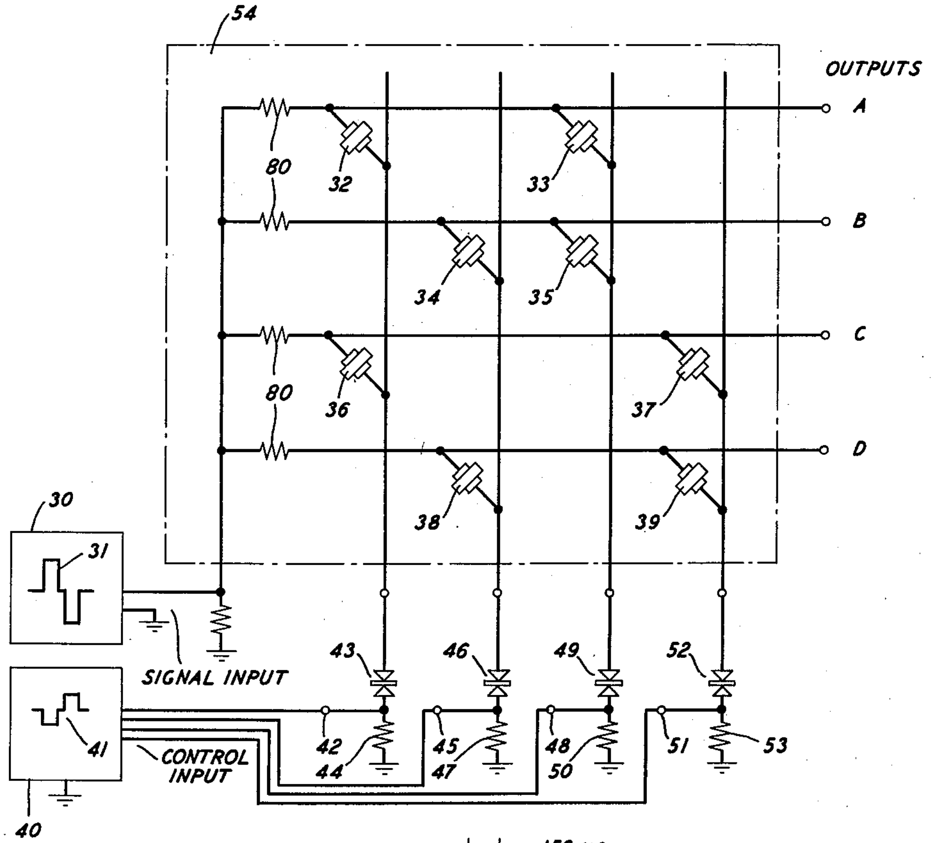
FIG. 6 is a schematic representation of a shunt switch selection matrix controlled by shunt type ferroelectric switches in accordance with another specific illustrative embodiment of this invention.

FIG. 6 depicts a four-output ferroelectric selection switch which is obtained by combining a number of the type switches depicted in FIG. 4. This type network may be used as an access switch for a storage matrix in a manner similar to the diode matrix switch which is well known in the art. However, unlike the diode switch, this network can be used to transmit pulses of either polarity. This bipolar operation is advantageous when the switch is used to drive coincident voltage ferroelectric or coincident current ferromagnetic storage matrices.

The switch depicted in FIG. 6 comprises a plurality of ferroelectric switch capacitors 32 through 39 arranged in a rectangular array. The common row electrodes are connected through resistors 80 to the signal input source 30. The common column electrodes are connected through individual saturation diodes 43, 46, 49, and 52 to individual outputs of the control source 40. The individual control inputs are applied to control terminals 42, 45, 48, and 51 connected to resistors 44, 47, 50, and 53.

Figure 7:
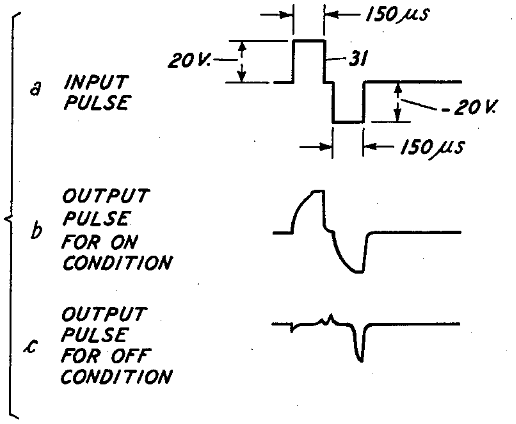
FIG. 7 depicts time plots of various voltages of the switch depicted in FIG. 6.

If an input signal is applied to the matrix from source 30 of the waveform depicted at 31 of FIG. 7*a*, this signal will be applied to each of capacitors 32 through 39. The appropriate output, A, B, C or D, may be selected by applying control pulses 41 from source 40 to control terminal 42 or 45 and applying control pulses 41 to terminal 48 or 51. Both the input pulses and the two control pulses are to be concurrently applied and the control pulses are complementary in polarity with the signal pulses. For example, the application of control pulses to terminal 42 combines with the signal pulses applied to capacitors 32 and 36 to overcome the saturation diode 43 and switch capacitors 32 and 36 through diode 43 and resistor 44 as well as to reset these capacitors. Thus, these two capacitors effectively present their low valued switching resistance to the signal pulses and short-circuit loads A and C. Similarly, if control pulses are applied to terminal 48, capacitors 33 and 35 are switched and reset. Thus, the switching resistance of these last two capacitors short-circuits loads A and B. With this combination of control pulses at terminals 42 and 48, the signal pulses will be derived only at output terminal D. The output pulses delivered to terminal D under these conditions are represented by the time plot of FIG. 7*b* while the output pulses at each of terminals A, B and C are represented by the time plot of FIG. 7*c*.

Thus, it is seen that the four-output ferroelectric selection switch can supply any one of four outputs depending on the proper application of control pulses. In a similar manner, this network may be expanded to control the input to a storage matrix of any size such as, for example, the 16 x 16 ferroelectric matrix.

Figure 8:
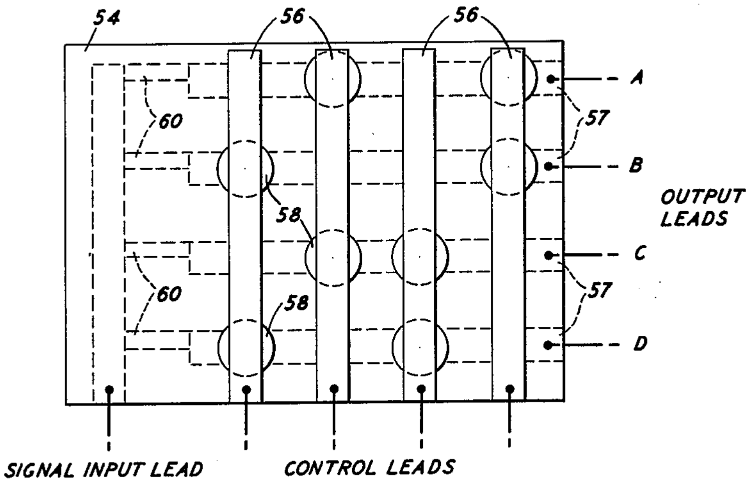
FIG. 8 is a plan view of a ferroelectric shunt switch selection matrix in accordance with this invention.

FIG. 8 is a plan view of one specific embodiment of the four-output ferroelectric selection switch of FIG. 6. Ferroelectric crystal 54 is used both as a mounting plate for resistors 60 and a dielectric medium for the ferroelectric capacitors defined by certain intersections of electrodes 56 and 57. Electrodes 56 and 57 are deposited on opposite sides of the crystal in a known manner. Where no capacitor is to be employed between the certain intersections of electrodes 56 and 57, a very thin layer of low dielectric constant insulating material 58 of the order of less than 0.001 inch is deposited before the electrode is deposited to almost completely disconnect the crosspoint. Thus, a mask having holes at all the undesired crosspoints is first placed over the crystal and a low dielectric material, such as Krylon or polystyrene in liquid form, is sprayed into the holes of the mask. The mask is then removed and the crystal is placed in a rectangular two-dimensional matrix mask and electrodes are vacuum vapor plated upon the crystal in the same manner employed for making ferroelectric storage matrices. Suitable resistance material 60 is now deposited between a signal input lead and the output lead. Input, output and control leads may now be connected to the electrodes in a known manner.

Figure 9:
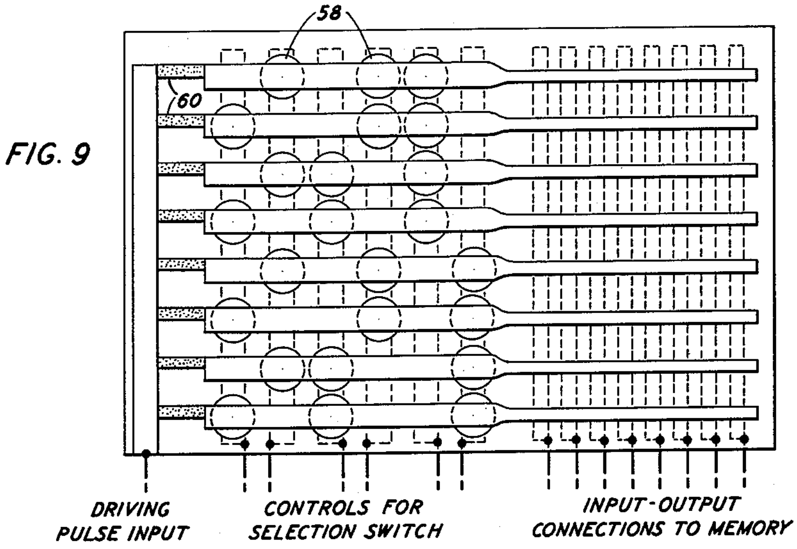
FIG. 9 is a plan view of a combination shunt switch selection matrix and a ferroelectric storage matrix in accordance with this invention.

FIG. 9 depicts an expanded embodiment of the selection switch of FIG. 8 in combination with an 8 x 8 ferroelectric storage matrix and may be fabricated in a similar manner.

Figure 10:
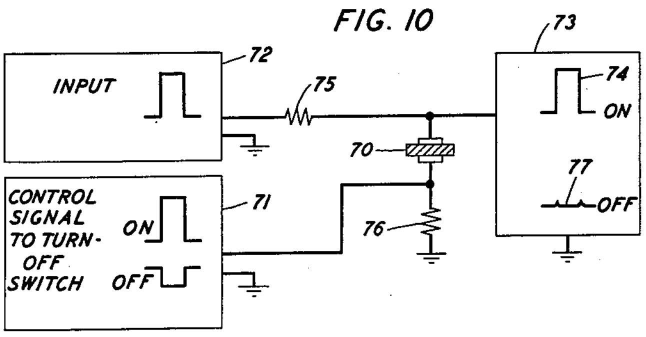
FIG. 10 is a schematic representation of a biased ferroelectric switch in accordance with this invention.
Figure 11:
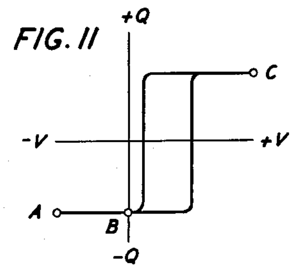
FIG. 11 is a plot of a hysteresis loop response curve of the ferroelectric capacitor of FIG. 10.

FIG. 10 depicts a bias switch, in accordance with this invention, in which the ferroelectric material of capacitor 70 exhibits an internal bias, as depicted by the hysteresis loop of FIG. 11. Capacitor 70 may advantageously have a dielectric of guanidinium aluminum sulphate hexahydrate or other materials disclosed in B. T. Matthias application Serial No. 489,193, filed February 18, 1955, now Patent No. 2,901,679. When no potentials are applied to capacitor 70, the polarization is that of point B in FIG. 11. If a positive pulse is applied from source 71 at the same time that a positive pulse is applied from source 72, capacitor 70 will not be switched because the pulses are noncomplementary. The output pulse delivered to load 73 under these conditions will be that represented by waveform 74. If now a small negative pulse is applied from source 71 at the same time that a positive pulse is applied from source 72, the bias will be overcome by the complementary pulses from sources 71 and 72 and capacitor 70 will be switched. Current from source 72 is delivered to resistor 76 and relatively no current is delivered to load 73 as depicted in waveform 77.

It is to be understood that the above-described arrangements are illustrative of the application of the principles of the invention. Numerous other arrangements may be devised by those skilled in the art without departing from the spirit and scope of the invention.

What is claimed is:

1. A ferroelectric gating circuit for selectively transmitting pulses between an input terminal and an output terminal comprising a source of pulses to be gated connected to said input terminal, an impedance element connecting said input and output terminals, a ferroelectric capacitor having a dielectric material exhibiting two stable remanent polarization states and having two electrodes, means connecting one of said electrodes to the output side of said impedance element, and means for selectively applying a potential to the other of said electrodes simultaneously with a pulse from said source being applied to said input terminal to control the reversal of the remanent polarization of said dielectric, said pulse being transmitted to said output terminal only in the absence of reversal of the remanent polarization of said dielectric.

2. A ferroelectric switch circuit in accordance with claim 1 wherein said impedance element comprises a resistor.

3. A ferroelectric switch circuit in accordance with claim 1 wherein said impedance element comprises a second ferroelectric capacitor.

4. A ferroelectric switch circuit in accordance with claim 1 wherein said ferroelectric material has an internal bias.

5. A ferroelectric switch circuit in accordance with claim 1 wherein said means connected to said other electrode includes means for applying a resetting pulse to said other electrode when the polarization of said ferroelectric material has been reversed.

6. A ferroelectric switch circuit comprising an input terminal, an output terminal, a conductive path between said terminals including an impedance element, a ferroelectric capacitor having a dielectric of a ferroelectric material and a pair of electrodes, means connecting one of said electrodes to said path between said impedance element and said output terminal, a pair of oppositely poled saturation diodes connected to the other electrode of said capacitor, and means for applying control signals to said diodes to control reversal of the state of polarization of said ferroelectric material upon the application of an input pulse at said input terminal whereby said input pulse will appear at said output terminal only in the absence of said control signals applied to said diodes.

7. A ferroelectric switch circuit in accordance with claim 6 wherein said impedance means comprises a resistor.

8. A ferroelectric gating circuit comprising input and output terminals, a source of pulses to be gated connected to said input terminal, a resistor connecting said input and output terminals, a ferroelectric capacitor comprising a dielectric material exhibiting two stable remanent polarization states and having two terminals attached to opposite sides of said dielectric, means connecting one of said terminals to the output side of said resistor, and means connected to said other terminal for selectively reversing the remanent polarization of said dielectric to control the passage of pulses from said source to said output terminal, said means connected to said other terminal including means for applying a complementary pulse to said other terminal simultaneously with the occurrence of a pulse from said pulse source, the combination of said complementary pulse and said pulse from said pulse source being sufficient to reverse the remanent polarization of said dielectric and said means connected to said other terminal further including means for applying a pulse simultaneously with the occurrence of a pulse from said pulse source to prevent the reversal of said remanent polarization by said pulse from said pulse source.

9. A ferroelectric gating circuit comprising input and output terminals, a source of pulses to be gated connected to said input terminal, a resistor connecting said input and output terminals, a ferroelectric capacitor comprising a dielectric material exhibiting two stable remanent polarization states and having two terminals attached to opposite sides of said dielectric, means connecting one of said terminals to the output side of said resistor, and means connected to said other terminal for selectively reversing the remanent polarization of said dielectric to control the passage of pulses from said pulse source to said output terminal, said means connected to said other terminal including means for applying a complementary pulse to said other terminal simultaneously with the occurrence of a pulse from said pulse source. the combination of said complementary pulse and said pulse from said pulse source being sufficient to reverse the remanent polarization of said dielectric and said means connected to said other terminal further including a pair of oppositely poled saturation diodes connecting said complementary pulse applying means to said other terminal.

10. A ferroelectric gating circuit for selectively transmitting pulses between an input terminal and an output terminal comprising a source of pulses to be gated connected to said input terminal, an impedance element connecting said input and output terminals, a ferroelectric capacitor having a dielectric material exhibiting two stable remanent polarization states and having two electrodes, means connecting one of said electrodes to the output side of said impedance element, and means for selectively applying a potential to the other of said electrodes, means connecting one of said electrodes to the applied to said input terminal to reverse the remanent polarization of said dielectric to inhibit passage of said pulse to said output terminal, said pulse being transmitted to said output terminal in the absence of said potential at said other electrode.

11. A switching circuit for transmitting pulses between an input terminal and selected ones of a plurality of output terminals comprising a plurality of ferroelectric gating circuits; each of said gating circuits being connected between said input terminal and a particular one of said output terminals; and a source of pulses to be gated connected to said input terminal; wherein each of said gating circuits includes an impedance element connecting said input and said output terminals, a ferroelectric capacitor having a dielectric material exhibiting two stable remanent polarization states and having two electrodes, means connecting one of said electrodes to the output side of said impedance element, and means for selectively applying a potential to the other of said electrodes simultaneously with a pulse from said source being applied to said input terminal to control the reversal of the remanent polarization of said dielectric, said pulse being transmitted to said output terminal only in the absence of reversal of the remanent polarization of said dielectric.

12. A switching circuit in accordance with claim 11 additionally including a plurality of saturation diodes, a plurality of impedances, a reference potential, and means for connecting said other electrodes in groups to individual ones of said saturation diodes, each one of said second-named impedances being connected between a different one of said saturation diodes and said reference potential.

13. A switching circuit in accordance with claim 12 wherein said potential applying means include means for applying complementary pulses concurrently with said signal pulses at points intermediate selected saturation diodes and said second-named impedances.

References Cited in the file of this patent

UNITED STATES PATENTS

| | | |
|---|---|---|
| 2,666,195 | Bacheiet | Jan. 12, 1954 |
| 2,695,396 | Anderson | Nov. 23, 1954 |
| 2,717,372 | Anderson | Sept. 6, 1955 |
| 2,728,693 | Cado | Dec. 27, 1955 |
| 2,754,230 | McLean et al. | July 10, 1956 |
| 2,872,661 | Young | Feb. 3, 1959 |
| 2,922,143 | Epstein | Jan. 19, 1960 |

OTHER REFERENCES

"Ferroelectrics for Digital Information Storage and Switching" (Buck), Report R–212, Digital Computer Laboratory, Massachusetts Institute of Technology, June 5, 1952, pp. 26 to 29 and FIGS. 26, 27, 28 and 31 relied upon (4 shts. of drawing).